US012776719B2

(12) United States Patent
Yang et al.

(10) Patent No.: US 12,776,719 B2
(45) Date of Patent: Oct. 27, 2026

(54) CONTROL DEVICE AND METHOD OF FLYBACK CONVERTER, FLYBACK CONVERTER AND POWER SUPPLY SYSTEM

(71) Applicant: SHANGHAI BRIGHT POWER SEMICONDUCTOR CO., LTD., Shanghai (CN)

(72) Inventors: Pengbo Yang, Shanghai (CN); Zhen Zhu, Shanghai (CN); Xiaoru Gao, Shanghai (CN); Shuai Wu, Shanghai (CN); Yanmei Guo, Shanghai (CN)

(73) Assignee: SHANGHAI BRIGHT POWER SEMICONDUCTOR CO., LTD., Shanghai (CN)

(*) Notice: Subject to any disclaimer, the term of this patent is extended or adjusted under 35 U.S.C. 154(b) by 191 days.

(21) Appl. No.: 18/809,783

(22) Filed: Aug. 20, 2024

(65) Prior Publication Data

US 2025/0070681 A1 Feb. 27, 2025

(30) Foreign Application Priority Data

Aug. 22, 2023 (CN) ......................... 202311062058.4

(51) Int. Cl.
*H02M 3/335* (2006.01)
*H02M 1/00* (2006.01)

(52) U.S. Cl.
CPC ..... *H02M 3/33592* (2013.01); *H02M 1/0058* (2021.05)

(58) Field of Classification Search
CPC ........... H02M 3/33592; H02M 1/0058; H02M 3/33523; H02M 1/083; Y02B 70/10
See application file for complete search history.

(56) References Cited

U.S. PATENT DOCUMENTS

2023/0361689 A1* 11/2023 Khamesra ........... H02M 1/0035

* cited by examiner

*Primary Examiner* — Crystal L Hammond
*Assistant Examiner* — Jonathan Walter Soileau
(74) *Attorney, Agent, or Firm* — MUNCY, GEISSLER, OLDS & LOWE, P.C.

(57) ABSTRACT

A control device and method for a flyback converter, a flyback converter and a power supply system are disclosed. The device is configured to apply a tuning voltage or current to a connection node of a secondary winding and a synchronous rectifier within a predetermined period of time after the synchronous rectifier is turned off and before a power transistor switch is turned on. It is also configured to, after the tuning voltage or current is applied, transmit a request signal requesting the power transistor switch to be turned on to a primary controller. The primary controller then turns on the power transistor switch based on the received request signal.

18 Claims, 6 Drawing Sheets

CONTROL DEVICE AND METHOD OF FLYBACK CONVERTER, FLYBACK CONVERTER AND POWER SUPPLY SYSTEM

CROSS-REFERENCE TO RELATED APPLICATION

This application claims the priority of Chinese patent application number 202311062058.4, filed on Aug. 22, 2023 and entitled "CONTROL DEVICE AND METHOD OF FLYBACK CONVERTER, FLYBACK CONVERTER AND POWER SUPPLY SYSTEM", the entire contents of which are incorporated herein by reference.

TECHNICAL FIELD

The present invention pertains to the field of flyback converter control technology, and particularly relates to a control device and method of a flyback converter, a flyback converter and a power supply system.

BACKGROUND

Reference is made to FIG. 1, a schematic diagram showing the structure of a typical conventional flyback converter. As can be seen from FIG. 1, the conventional flyback converter includes a transformer T, a power transistor switch Q1, a synchronous rectifier SR, a secondary controller 200, a primary controller 100 and a capacitor C0. A first terminal (e.g., drain) DRAIN of the power transistor switch Q1 is connected to one terminal of a primary winding Np in the transformer T. A second terminal (e.g., source) of the power transistor switch Q1 is connected to ground terminal PGND. The other end of the primary winding Np in the transformer T is connected to a positive DC bus. The synchronous rectifier SR is connected in series with a secondary winding Ns in the transformer T and then they are connected between an output terminal and a ground terminal of the flyback converter SGND. In operation, the primary controller 100 outputs a control signal Q1_C to a control terminal of the power transistor switch Q1 to turn on or off the power transistor switch Q1. The secondary controller 200 outputs a control signal SR_C to a control terminal of the synchronous rectifier SR to turn on or off the synchronous rectifier SR. When the power transistor switch Q1 is turned on by the primary controller 100, a current flows through the primary winding in the transformer T and the power transistor switch Q1, causing storage of energy in a magnetic field of the transformer T. When the power transistor switch Q1 is turned off by the primary controller 100 and the synchronous rectifier SR is turned on by the secondary controller 200, the transformer T releases energy, creating a current flowing through the secondary winding in the transformer T and the synchronous rectifier SR, and energy is stored in the capacitor C0, producing an output voltage VOUT for a load 300. In the flyback converter, before the power transistor switch Q1 is turned on, there tends to be a non-zero voltage at its drain DRAIN, which may cause considerable switching loss, leading to a decrease in efficiency and a greater temperature rise. Specifically, reference is now made to FIG. 2, a schematic diagram showing waveforms of main signals in the flyback converter of FIG. 1. As can be seen from FIG. 2, at time t1, the primary controller 100 controls the power transistor switch Q1 to be turned off, and the secondary controller 200 then controls the synchronous rectifier SR to be turned on. As a result, the secondary winding in the transformer T starts to freewheel through the synchronous rectifier SR. At t2, the secondary controller 200 controls the synchronous rectifier SR to be turned off, and after complete demagnetization of the secondary winding, voltages respectively at the drain DRAIN of the power transistor switch Q1 and at the connection node V_Forw of the secondary winding and the synchronous rectifier both start to oscillate. At t3, the primary controller 100 controls the power transistor switch Q1 to be turned on. As can be seen from FIG. 1, the voltage at the drain DRAIN of the power transistor switch Q1 starts to decrease at t3, leading to the presence of a non-zero voltage when the power transistor switch Q1 is turned on. As noted above, this may cause considerable switching loss, leading to a decrease in efficiency and a greater temperature rise.

In order to reduce the switching loss and thereby achieve increased efficiency and temperature rise suppression, there has been proposed an active-clamp forward (ACF) flyback converter. This scheme adds an ACF circuit connected in parallel to the opposite terminals of the primary winding in the flyback converter, which can clamp the voltage at the drain of the power transistor switch when the power transistor switch is turned off. Although this scheme can produce some improvements, these are limited, let alone that the scheme itself requires complex peripheral circuitry and timing control, which will increase the cost and size of the flyback converter.

It should be noted that the information disclosed in this Background section is merely intended to provide a better understanding of the general context of the present invention and should not be taken as an acknowledgement or any form of admission that the information forms part of the common general knowledge of those skilled in the art.

SUMMARY OF THE INVENTION

It is an object of the present invention to overcome the problems of switching loss and reduced efficiency associated with the conventional flyback converter, which arise from the presence of a non-zero voltage when the power transistor switch is turned on, by presenting a control device and method of a flyback converter, a flyback converter and a power supply system. The invention enables zero-voltage-switching (ZVS) of a power transistor switch, which results in not only increased efficiency but also a reduced temperature rise, without complicating associated peripheral circuit or expanding the size of the flyback converter. Further, it is low in cost and easy to implement.

The above object is attained by a control device of a flyback converter constructed in accordance with the present invention. The flyback converter comprises a transformer, a power transistor switch connected to a primary winding in the transformer, a primary controller connected to a control terminal of the power transistor switch and a synchronous rectifier connected to a secondary winding in the transformer. The control device comprises: an input terminal configured to be connected to an output terminal of the flyback converter; a first output terminal configured to be connected to a control terminal of the synchronous rectifier; and a second output terminal configured to be connected to a connection node of the secondary winding and the synchronous rectifier.

The control device is configured to: apply a tuning voltage or current to the connection node within a predetermined period of time after the synchronous rectifier is turned off and before the power transistor switch is turned on; and after the tuning voltage or current is applied, transmit a request signal requesting the power transistor switch to be turned on to the primary controller through a third output terminal of the control device.

The primary controller is configured to turn on the power transistor switch based on the received request signal.

Optionally, the control device may comprise a secondary control module, a power supply module and a transmit (TX) module, the secondary control module comprising an input terminal configured to be connected to the input terminal of the control device, a first output terminal configured to be connected to the first output terminal of the control device, a second output terminal configured to be connected to an input terminal of the power supply module, and a third output terminal connected to an input terminal of the TX module, wherein the power supply module comprises an output terminal connected to the second output terminal of the control device, and wherein the TX module comprises an output terminal connected to the third output terminal of the control device, the power supply module configured to apply the tuning voltage or current to the connection node within the predetermined period of time after the synchronous rectifier is turned off and before the power transistor switch is turned on, the secondary control module configured to output a primary turn-on signal to the TX module after the power supply module completes the application of the tuning voltage or current, the TX module configured to transmit the request signal requesting the power transistor switch to be turned on to the primary controller based on the primary turn-on signal.

Optionally, the secondary control module may be configured to detect a voltage at the connection node using a voltage detection method and to determine a start time of application of tuning voltage or current by the power supply module based on the voltage at the connection node.

Optionally, the secondary control module may be configured to take an instant when the voltage at the connection node reaches its peak value as the start time of application of tuning voltage or current by the power supply module.

Optionally, the power supply module may comprise a charge pump, the charge pump comprising a first input terminal connected to the secondary control module, a second input terminal connected to the output terminal of the flyback converter, and an output terminal connected to the second output terminal of the control device, the charge pump configured to apply the tuning voltage or current to the connection node based on an output voltage of the flyback converter within the predetermined period of time after the synchronous rectifier is turned off and before the power transistor switch is turned on.

Optionally, the control device may be provided in the form of a control circuit chip.

The above object is also attained by a control method for a flyback converter according to the present invention. The flyback converter comprises a transformer, a power transistor switch connected to a primary winding in the transformer, a primary controller connected to a control terminal of the power transistor switch and a synchronous rectifier connected to a secondary winding in the transformer. The control method comprises:

applying a tuning voltage or current to a connection node of the secondary winding and the synchronous rectifier within a predetermined period of time after the synchronous rectifier is turned off and before the power transistor switch is turned on;

after the tuning voltage or current is applied, transmitting a request signal requesting the power transistor switch to be turned on to the primary controller; and turning on the power transistor switch by the primary controller based on the received request signal.

Optionally, a voltage detection method may be used to detect a voltage at the connection node, and a start time of application of the tuning voltage or current may be determined based on the voltage at the connection node.

The above object is also attained by a flyback converter constructed in accordance with the present invention, which comprises a transformer, a power transistor switch connected to a primary winding in the transformer, a primary controller connected to a control terminal of the power transistor switch and a synchronous rectifier connected to a secondary winding in the transformer. The flyback converter: utilizes the method as defined above to achieve zero-voltage turn-on of the power transistor switch; and/or comprises the control device as defined above, wherein the input terminal of the control device is connected to an output terminal of the flyback converter; the first output terminal of the control device is connected to a control terminal of the synchronous rectifier; and the second output terminal of the control device is connected to a connection node of the secondary winding and the synchronous rectifier.

Optionally, a source of the synchronous rectifier may be grounded, wherein a drain of the synchronous rectifier is connected to a first terminal of the secondary winding at the connection node, and the output terminal of the power supply module of the control device is connected to the connection node.

Alternatively, the source of the synchronous rectifier may be connected to a second terminal of the secondary winding at the connection node, wherein the output terminal of the power supply module is connected to the connection node, and the drain of the synchronous rectifier is connected to the output terminal of the flyback converter.

Optionally, the flyback converter may further comprise a first capacitor, first terminal of the first capacitor is connected to the output terminal of the flyback converter, and a second terminal of the first capacitor is grounded.

Optionally, the flyback converter may further comprise a rectifier circuit, the rectifier circuit comprising an input terminal connected to an AC power source, a first output terminal connected to a first terminal of the primary winding in the transformer, and a second output terminal connected to a second terminal of the power transistor switch, wherein a second terminal of the primary winding in the transformer is connected to a first terminal of the power transistor switch.

Optionally, the flyback converter may further comprise an energy absorber circuit connected to opposite terminals of the primary winding in the transformer.

The above object is also attained by a power supply system constructed in accordance with the present invention, which comprises the flyback converter as defined above.

The control device and method, flyback converter and power supply system of the present invention have the following advantages over the prior art:

In the control device of the invention, through applying a tuning voltage, or injecting a tuning current, to the connection node of the secondary winding and the synchronous rectifier in a predetermined period of time after the synchronous rectifier is turned off and before the power transistor switch is turned on, a greater current flows through the secondary winding, lowering a voltage at the drain of the power transistor switch. Moreover, after the application of the tuning voltage or current is completed, a request signal requesting the power transistor switch to be turned on is transmitted to the primary controller through the third output terminal of the control device, and the primary controller then turns on the power transistor switch based on the received request signal. As such, in the device of the invention, zero-voltage turn-on of the power transistor switch can be achieved, which can result in increased efficiency and a reduced temperature rise without complicating associated peripheral circuit. Thus, the size and cost of the device can be well controlled, it is made easy to implement.

Since the control method, flyback converter and power supply system of the present invention are of the same inventive concept as the control device of the invention, they have at least all the advantages of the control device of the invention. For the sake of brevity, no further description of these advantages is given here, and reference can be made to the above description in connection with the control device for more details of them.

LIST OF REFERENCE NUMERALS

Figure 1:
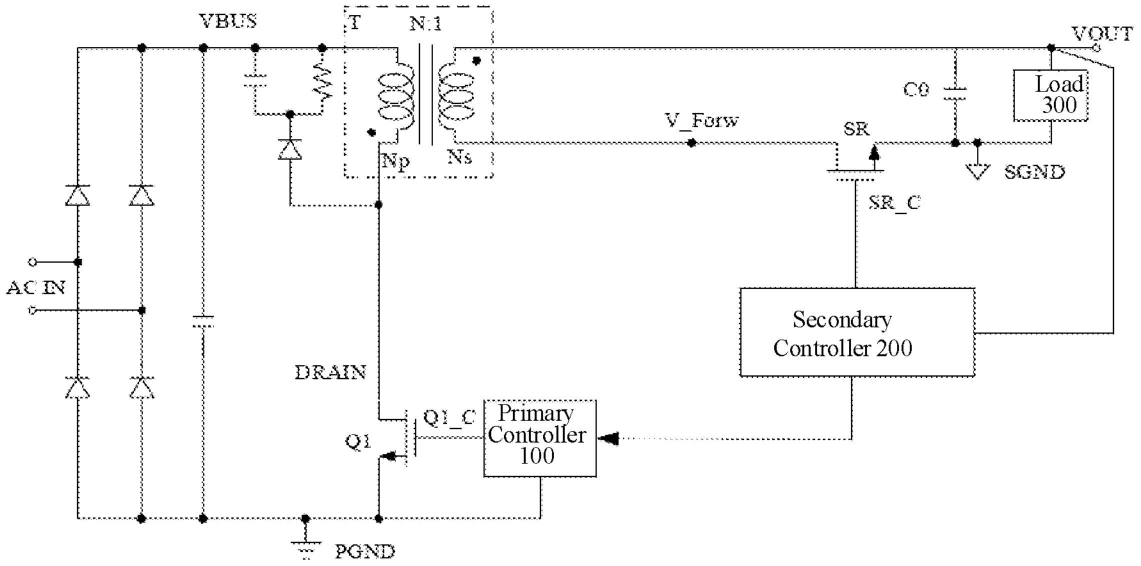
Fig. 1 (Prior Art)
FIG. 1 is a schematic diagram showing the structure of a typical conventional flyback converter.
Figure 2:
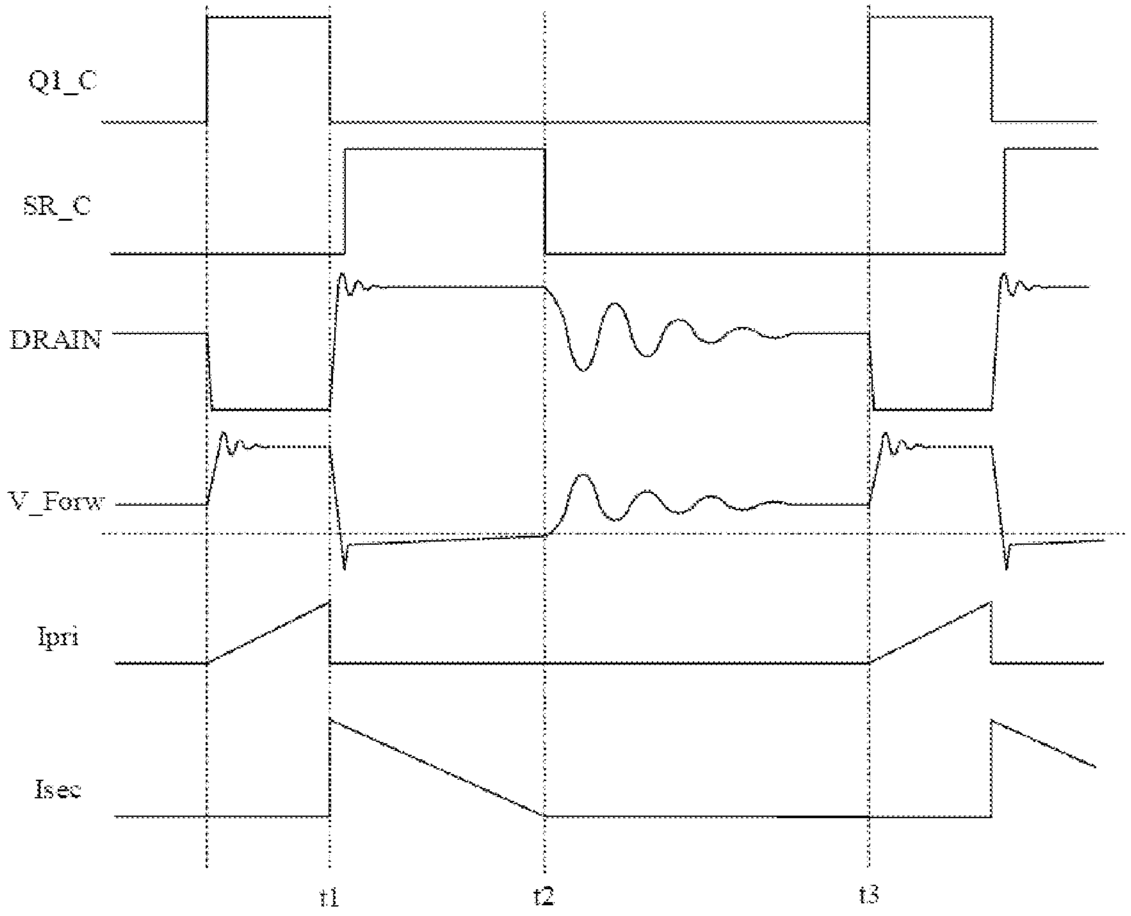
Fig. 2 (Prior Art)
FIG. 2 is a schematic diagram showing waveforms of main signals in the flyback converter of FIG. 1.

T—transformer; Q1—power transistor switch; SR—synchronous rectifier; C0—capacitor; Np—primary winding; Ns—secondary winding; 100—primary controller; 200—secondary controller; VBUS—bus voltage; 300—load; VOUT—output voltage; U—rectifier circuit; V_Forw—connection node;

400—control device; 410—control circuit chip; 411—secondary control module; 412—power supply module; 413 TX—module;

500—isolator;

C1—first capacitor; C2—second capacitor; C3—third capacitor; R—resistor; D—diode.

DETAILED DESCRIPTION

Objects, features and advantages of the present invention will become more apparent upon reading the following more detailed description of control devices and methods of a flyback converter, flyback converters and power supply systems disclosed herein with reference to the accompanying drawings. Note that the figures are provided in a very simplified form not necessarily drawn to exact scale for the only purpose of helping to explain the disclosed embodiments in a more convenient and clearer way. It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment. Moreover, in the embodiments described below, identical or functionally identical parts are sometimes designated with the same reference numerals among different figures, and repeated description thereof will be omitted. As used herein, same reference numerals and letters refer to same items in the annexed figures, and thus once an item is defined in one figure, it may not be discussed or further defined in the following figures. It will be understood that when an element is referred to as being "connected" or "coupled" to another element, it can be directly connected or coupled to the other element or intervening elements can be present. In contrast, when an element is referred to as being "directly connected" to another element, there are no intervening elements present.

In addition, use of the terms "first" and "second" herein is intended for illustration only and is not to be construed as denoting or implying relative importance or as implicitly indicating the number of the referenced features. Therefore, describing a feature with the term "first" or "second" can explicitly or implicitly indicate the presence of at least one of the referenced feature.

Where appropriate, these terms can be interchanged. Likewise, if a method is described herein as comprising a series of steps, the order of such steps as presented herein is not necessarily the only order in which such steps may be performed, and certain steps of the stated steps may possibly be omitted and/or certain other steps not described herein may possibly be added to the method.

Essentially, the present invention seeks to provide a control device and method of a flyback converter, a flyback converter and a power supply system, which enable zero-voltage turn-on of a power transistor switch in the flyback converter. This can result in improved efficiency and a reduced temperature rise without complicating associated peripheral circuit. Thus, the cost and size of the flyback converter can be well controlled.

To this end, in one embodiment of the present invention, there is provided a flyback converter control device. Specifically, reference is now made to FIG. 3, which illustrates an exemplary flyback converter employing a control device according to an embodiment of the present invention. As can be seen from FIG. 3, the flyback converter includes a transformer T, a power transistor switch Q1 connected to a primary winding Np in the transformer T, a primary controller 100 connected to a control terminal of the power transistor switch Q1 and a synchronous rectifier SR connected to a secondary winding Ns in the transformer T. One terminal of the primary winding Np in the transformer T is connected to a first terminal of the power transistor switch Q1, and the other terminal of the primary winding Np in the transformer T is connected to a positive DC bus. A second terminal of the power transistor switch Q1 is connected to a negative DC bus PGND which may be grounded. One terminal of the secondary winding Ns in the transformer T is connected to the synchronous rectifier at a connection node V_Forw. In particular, an input terminal of the control device 400 is connected to an output terminal of the flyback converter. A first output terminal of the control device 400 is connected to a control terminal of the synchronous rectifier SR, and a second output terminal of the control device 400 is connected to the connection node V_Forw of the secondary winding Ns and the synchronous rectifier SR. The control device 400 is configured to: apply a tuning voltage or current to the connection node V_Forw within a predetermined period of time after the synchronous rectifier SR is turned off and before the power transistor switch Q1 is turned on (the predetermined period of time may be determined, for example, as the interval from t3 to t4 in FIG. 5, from related parameters such as parameters of related functional elements in the flyback converter, a voltage at the connection node V-Forw, or an output voltage of the flyback converter); and after the tuning voltage or current is applied, transmit a request signal requesting the power transistor switch Q1 to be turned on to the primary controller 100 through a third output terminal of the control device 400. The primary controller 100 is configured to turn on the power transistor switch Q1 based on the received request signal. It is noted that, in this embodiment, the connection node V_Forw at which the secondary winding Ns is connected to the synchronous rectifier SR may be located anywhere on a wire connecting the secondary winding Ns and the synchronous rectifier SR. Optionally, the third output terminal of the control device 400 is connected to an input terminal of an isolator 500, and an output terminal of the isolator 500 is connected to the primary controller 100. As such, the isolator 500 can receive the request signal, isolate the received signal and transmit the isolated signal to the primary controller 100.

In the control device 400 of this embodiment, through applying a tuning voltage, or injecting a tuning current, to the connection node V_Forw in the flyback converter in a predetermined period of time after the synchronous rectifier is turned off and before the power transistor switch is turned on, a greater current flows through the secondary winding Ns, lowering a voltage at a drain of the power transistor switch Q1. Moreover, after the application of the tuning voltage or current is completed, a request signal requesting the power transistor switch Q1 to be turned on is transmitted to the primary controller 100 through the third output terminal of the control device 400, and the primary controller 100 then turns on the power transistor switch Q1 based on the received request signal. As such, the control device 400 of this embodiment enables zero-voltage turn-on of the power transistor switch Q1 in the flyback converter, which can result in increased efficiency and a reduced temperature rise without complicating associated peripheral circuit. Thus, the size and cost of the flyback converter can be well controlled, it is made easy to implement.

It is noted that, in light of the foregoing teachings, those skilled in the art will understand the control device 400 of the present invention basically operates in such a manner that the output voltage VOUT of the flyback converter may be detected before the power transistor switch Q1 in the flyback converter is turned on. When it is found that it is necessary to add energy to the output voltage VOUT of the flyback converter, a voltage or current is applied to the connection node V_Forw to reduce a voltage at the first terminal (e.g., drain) of the power transistor switch Q1. After completion of application of the tuning voltage or current (to cause a drop of the voltage at the drain of the power transistor switch Q1 to zero or nearly to zero), a request signal is provided to cause the primary controller 100 to turn on the power transistor switch Q1, thus reducing switching loss and a temperature rise of the power transistor switch Q1 and thereby improving efficiency of the flyback converter.

Figure 4:
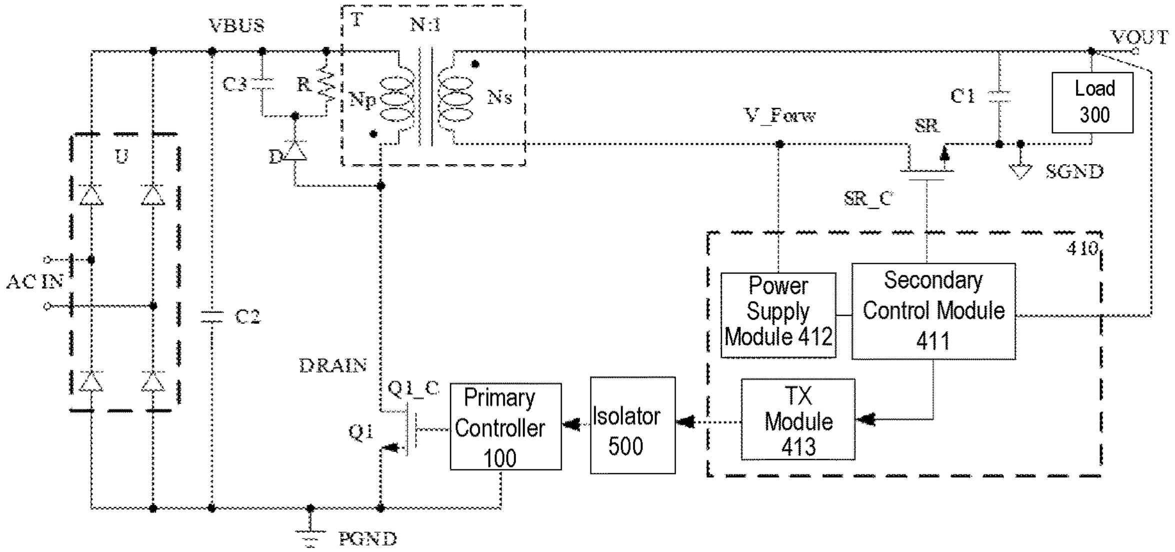
FIG. 4 shows an exemplary flyback converter employing a control device according to an embodiment of the present invention.

FIG. 4 schematically shows an exemplary flyback converter employing a control device 400 according to some exemplary embodiments. As can be seen from FIG. 4, the control device 400 according to these embodiments further includes a secondary control module 411, a power supply module 412 and a transmit (TX) module 413. Specifically, an input terminal of the secondary control module 411 is connected to the input terminal of the control device 400. That is, the input terminal of the secondary control module 411 is connected to the output terminal of the flyback converter. A first output terminal of the secondary control module 411 is connected to the first output terminal of the control device 400. That is, the first output terminal of the secondary control module 411 is connected to the control terminal of the synchronous rectifier SR. A second output terminal of the secondary control module 411 is connected to an input terminal of the power supply module 412, and an output terminal of the power supply module 412 is connected to the second output terminal of the control device 400. That is, the output terminal of the power supply module 412 is connected to the connection node V_Forw of the secondary winding Ns and the synchronous rectifier SR. A third output terminal of the secondary control module 411 is connected to an input terminal of the TX module 413, and an output terminal of the TX module 413 is connected to the third output terminal of the control device 400. That is, the output terminal of the TX module 413 is connected to the isolator 500. Functions of the secondary control module 411, the power supply module 412 and the TX module 413 are described in greater detail below.

The power supply module 412 is configured to apply the tuning voltage or current to the connection node V_Forw in the predetermined period of time after the synchronous rectifier SR is turned off and before the power transistor switch Q1 is turned on. That is, within the predetermined period of time after the synchronous rectifier SR is turned off and before the power transistor switch Q1 is turned on, the secondary control module 411 controls the power supply module 412 to apply the tuning voltage or current to the connection node V_Forw of the secondary winding Ns and the synchronous rectifier SR. The secondary control module 411 is configured to output a primary turn-on signal to the TX module 413 after the application of the tuning voltage or current by the power supply module 412 is completed. The TX module 413 is configured to transmit, based on the primary turn-on signal, the request signal requesting the power transistor switch Q1 to be turned on. Specifically, after being transmitted by the TX module 413, the request signal passes through the isolator 500 to the primary controller 100. The secondary control module 411 is configured to turn on or off the synchronous rectifier SR. In some embodiments, the secondary control module 411 is configured to control the power supply module 412 to apply the tuning voltage or current to the connection node V_Forw of the secondary winding Ns and the synchronous rectifier SR within the predetermined period of time.

In these embodiments, the control device 400 additionally includes the secondary control module 411, the power supply module 412 and the TX module 413. The power supply module 412 is used to provide the tuning voltage or current and apply the tuning voltage or current to the output of the secondary winding Ns within the predetermined period of time after the synchronous rectifier SR is turned off and before the power transistor switch Q1 is turned on. After the application of the tuning voltage or current by the power supply module 412 is completed, the secondary control module 411 outputs the primary turn-on signal to the TX module 413. Wherein, when the secondary control module 411 determines that it is necessary to add energy to the output terminal of the flyback converter, the power supply module 412 is controlled to apply the tuning voltage or current to the output of the secondary winding Ns within the predetermined period of time. After being transmitted by the TX module 413 based on the primary turn-on signal, the request signal passes through the isolator 500 to the primary controller 100. This modular design allows associated circuits and circuit elements of the secondary control module 411, the power supply module 412 and the TX module 413 to be included depending on the requirements of practical applications. This can not only further increase the applicability of the control device 400 of the present invention, but can also additionally facilitate its maintenance.

Notably, as would be appreciated by those skilled in the art, the present invention is not limited to any particular implementation of the secondary control module 411, the power supply module 412 or the TX module 413. Specifically, the present invention is not limited to any particular implementation of the secondary control module 411. Implementations of the secondary control module 411 may include, but are not limited to, dedicated hardware and dedicated hardware combined with computer instructions. Also, the present invention is not limited to any particular type of power supply module 412, and the power supply module 412 may include, but are not limited to including, a voltage-to-voltage converter, a voltage-to-current converter or the like. Further, the present invention is not limited to any particular TX module 413 or isolator 500, and the isolator 500 may include, but is not limited to including, any of an optocoupler, an isolating capacitor and a magnetic isolator.

Optionally, in some exemplary embodiments, the control device 400 is provided in the form of an integrated control circuit chip 410. In this way, it is made unnecessary to complicate associated peripheral circuit of the flyback converter employing the control device 400, and the cost and size of the flyback converter can be well controlled. Moreover, providing the control device 400 as an integrated control circuit chip 410 can facilitate deployment of the control device 400 of the present invention on the flyback converter and maintenance of the flyback converter employing the control device 400.

Optionally, in one exemplary embodiment, the secondary control module 411 is configured to detect the voltage at the connection node V_Forw using a voltage detection method and to determine a start time of application of the tuning voltage or current by the power supply module 412 based on the voltage at the connection node V_Forw.

Optionally, the control device 400 of the present invention further includes a sampling circuit (not shown) configured to sample the output voltage VOUT of the flyback converter, convert the sampled output voltage VOUT into a sample signal that is proportional to the sampled output voltage and provide the sample signal to the secondary control module 411, so as to determine the output voltage VOUT. In other embodiments, the sampling circuit is provided in the secondary control module 411. The secondary control module 411 receives the sample signal and determines whether it is necessary to add energy to the output terminal of the flyback converter. If the determination is positive, the power supply module 412 is controlled to apply the tuning voltage or current to the output of the secondary winding Ns within the predetermined period of time and after the application of the tuning voltage or current is completed, the primary turn-on signal is output.

Optionally, the control device 400 of the present invention further includes a voltage sampling circuit configured to sample the voltage at the connection node V_Forw, and the secondary control module 411 can determine the start time of application of the tuning voltage or current by the power supply module 412 based on the voltage at the connection node V_Forw.

Optionally, after the synchronous rectifier SR is turned off, the voltages respectively at the first terminal of the power transistor switch Q1 and the connection node V_Forw of the secondary winding and the synchronous rectifier SR are both oscillating, the secondary control module 411 is configured to take a instant at which the voltage at the connection node V_Forw reaches its peak value as the start time of application of the tuning voltage or current by the power supply module 412. The power supply module 412 applies the tuning voltage or current to the connection node V_Forw within the predetermined period of time that starts from the start time, thereby reducing the voltage at the first terminal DRAIN of the power transistor switch Q1 to a low level. After that, the secondary control module 411 produces the primary turn-on signal, and the TX module 413 transmits the request signal based on the primary turn-on signal, the request signal then passes through the isolator 500 to the primary controller 100 so as to turn on the power transistor switch Q1. In this way, zero-voltage or quasi-zero-voltage turn-on of the power transistor switch Q1 is achieved, resulting in an improvement in efficiency of the flyback converter. It is noted that the present invention is not limited to any particular method of detecting the peak value of the voltage at the connection node V_Forw, and any method and/or device capable of detecting the peak value known to those skilled in the art can be used. For ease of understanding and brevity of explanation, further description of how the peak value is detected is omitted herein, and reference can be made to published literature for more details in this regard.

It is noted that the predetermined period of time may be a period of time defined between an instant when the synchronous rectifier SR is turned off and an instant when the request signal is transmitted by the control device 400. The period of time may be close to a time when the request signal is transmitted by the control device 400, or close to the middle of the period from an instant when the synchronous rectifier SR is turned off to an instant when the request signal is transmitted by the control device 400, or close to a time when the synchronous rectifier SR is turned off.

Notably, as would be appreciated by those skilled in the art, the flyback converter may operate in a continuous conduction mode (CCM), or in a discontinuous conduction mode (DCM). The control device 400 of the present invention is particularly suitable for DCM operation of the flyback converter.

Figure 5:
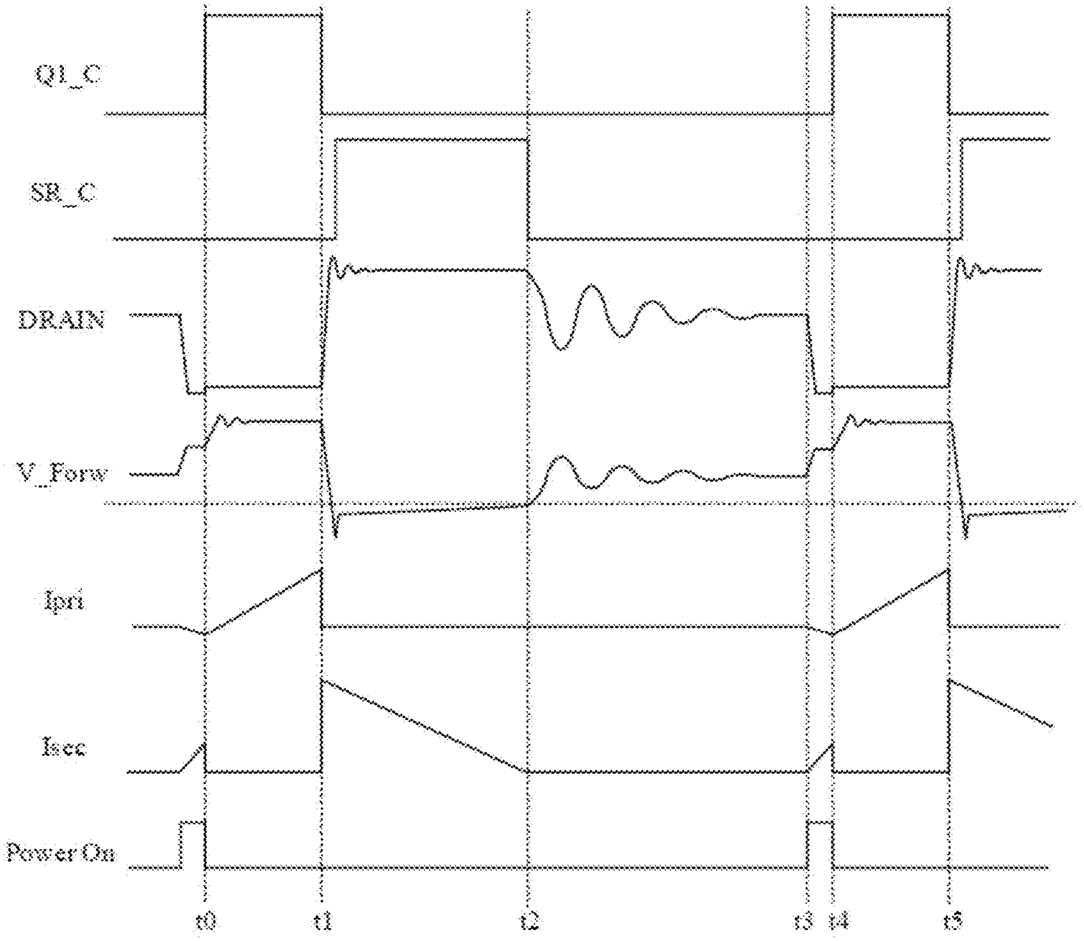
FIG. 5 is a schematic diagram showing waveforms of main signals in the flyback converter of FIG. 4.

In a specific example of the flyback converter, the application of the tuning voltage or current starts at time t3, as shown in FIG. 5. The power supply module 412 may determine, based on the output voltage VOUT of the flyback converter, whether to control the power supply module 412 to apply the tuning voltage or current to the connection node V_Forw. This results in a simpler circuit structure of the control device 400 of the present invention and makes it easier to implement. In other embodiments, the power supply module 412 may obtain energy from an external power supply and the output voltage of the flyback converter for enabling the application of the tuning voltage or current to the connection node V_Forw within the predetermined period of time. It is noted that the present invention is not limited to any particular method that the power supply module 412 uses to apply the tuning voltage or current.

For ease of understanding and explanation, only timing control of the control device 400 of the present invention for enabling zero-voltage turn-on of the power transistor switch Q1 in the flyback converter by applying the tuning voltage or current to the connection node V_Forw of the secondary winding Ns and the synchronous rectifier SR will be essentially described below as an example. From the following description, one will understand how to conduct timing control involving applying a tuning current to the output of the secondary winding Ns, and further description thereof is therefore omitted herein. Reference is now made to FIG. 5, a schematic diagram showing waveforms of main signals in the flyback converter of FIG. 4. FIG. 5 schematically illustrates operation of the flyback converter over one complete switching period. In FIG. 5, Q1_C denotes a schematic representation of the waveform of a voltage at the control (i.e., gate) terminal of the power transistor switch Q1, SR-C denotes a schematic representation of the waveform of a voltage at the control (i.e., gate) terminal of the synchronous rectifier SR, DRAIN denotes a schematic representation of the waveform of the voltage at the first terminal of the power transistor switch Q1, V_Forw denotes a schematic representation of the waveform of the voltage at the connection node V_Forw of the secondary winding Ns and the synchronous rectifier SR, Ipri denotes a schematic representation of the waveform of a current flowing through the primary winding Np, Isec denotes a schematic representation of the waveform of a current flowing through the secondary winding Ns, and Power_On denotes a schematic timing representation of the power supply module 412 showing when and how long it injects the tuning voltage or current to the connection node V_Forw of the secondary winding Ns and the synchronous rectifier SR. As can be readily seen from FIG. 5, the complete switching period (t1-t5) of the flyback converter employing the control device 400 of the present invention includes the intervals as follows:

t0-t1: an ON interval of the power transistor switch Q1 in the previous switching period, the primary controller 100 received a drive signal for turning on the power transistor switch Q1. Responsively, the voltage Q1_C at the control terminal of the power transistor switch Q1 changes from a low level to a high level at t0 (which corresponds to an actual turn-on instant t4 of the power transistor switch Q1 in the current switching period) and remains at the high level till t1. Throughout the interval t0-t1, the power transistor switch Q1 is in an ON state, and the voltage DRAIN at the drain of the power transistor switch Q1 is low, the current Ipri flowing through the primary winding of the transformer T rises linearly from zero, storing energy in the transformer T; the voltage SR_C at the control terminal of the synchronous rectifier SR remains low, and the synchronous rectifier SR is in an OFF state, the current Isec flowing through the secondary winding of the transformer T Ns is zero, and the voltage at the connection node V_Forw of the secondary winding Ns in the transformer T and the synchronous rectifier SR is high.

t1-t2: the voltage Q1_C at the control terminal of the power transistor switch Q1 changes from the high level to the low level at t1 (i.e., the instant when the current Ipri flowing through the primary winding Np rises to a preset value) and remains at the low level until the actual turn-on instant t4. Throughout the interval t1-t2, the power transistor switch Q1 is OFF, and the current Ipri flowing through the primary winding of the transformer T is zero, the voltage DRAIN at the drain of the power transistor switch Q1 starts to rise at t1; the voltage SR_C at the control terminal of the synchronous rectifier SR changes to a high level, and the synchronous rectifier SR is in an ON state; from t1, the voltage at the connection node V_Forw of the secondary winding Ns and the synchronous rectifier SR starts to drop, and the secondary side starts to freewheel, energy stored in the transformer T is transferred from the primary side to the secondary side; the current Isec flowing through the secondary winding Ns decreases linearly until end of demagnetization at t2 (i.e., an instant when the current Isec flowing through the secondary winding Ns drops to zero); at t2, the voltage SR_C at the control terminal of the synchronous rectifier SR changes to the low level.

t2-t3: the voltage Q1_C at the control terminal of the power transistor switch Q1 still remains low, and the current Ipri flowing through the primary winding remains zero. The voltage SR_C at the control terminal of the synchronous rectifier SR still remains low, and the current Isec flowing through the secondary winding Ns remains zero. The voltage DRAIN at the drain of the power transistor switch Q1 and the voltage at the connection node V_Forw of the secondary winding Ns and the synchronous rectifier SR both oscillate until t3 (in this example, t3 is the start time of application of tuning voltage or current by the power supply module 412). Notably, as would be appreciated by those skilled in the art, the above-discussed approach for determining the start time of application of tuning voltage or current by the power supply module 412 is described merely as an exemplary preferred embodiment and is not intended to limit the present invention in any sense. In alternative embodiments, the start time of application of tuning voltage or current by the power supply module 412 may also be determined by detecting information about voltage oscillation at the connection node V_Forw of the secondary winding Ns and the synchronous rectifier SR.

t3 to t4: zero-voltage turn-on of the power transistor switch Q1 is achieved by the control device 400 of the present invention. At t3, the secondary control module 412 transmits a control signal Power On to the power supply module 412, which causes the power supply module 412 to inject the tuning voltage to the connection node V_Forw of the secondary winding Ns and the synchronous rectifier SR. As a result, the current Isec flowing through the secondary winding Ns rises linearly. The control signal Power On has a pulse width corresponding to a time length of application of the tuning voltage or current. Assuming the applied tuning voltage is VBK, a voltage applied to the secondary winding Ns can be expressed as VBK-VOUT, where VOUT represents the output voltage of the flyback converter. Denoting a turns ratio of the primary winding Np and the secondary winding Ns as N, the voltage across the primary winding Np is obtained as N×(VBK-VOUT). Accordingly, the voltage at the drain of the power transistor switch Q1 drops to VBUS-Nx (VBK-VOUT) and then oscillates freely under the effect of leakage inductance and parasitic capacitance at the drain of the power transistor switch Q1. VBUS represents a voltage of the DC buses. Throughout the interval t3-t4, the voltage Q1_C at the control terminal of the power transistor switch Q1 and the voltage SR_C at the control terminal of the synchronous rectifier SR both still remain low. The current Ipri flowing through the primary winding Np is reversed and rises linearly, and the current Isec flowing through the secondary winding Ns rises linearly. The voltage DRAIN at the drain of the power transistor switch Q1 drops. Zero voltage or quasi-zero-voltage turn-on of the power transistor switch Q1 can be achieved by properly configuring the predetermined period of time. At t4, the control device 400 transmits the request signal to the primary controller 100, which turns on the power transistor switch Q1. Consequently, the voltage Q1_C at the control terminal of the power transistor switch Q1 is changed to the high level. As an example, a parasitic diode D in the power transistor switch Q1 may clamp the voltage DRAIN at its drain at −0.7 V through the interval t3 to t4.

t4 to t5: this is an ON interval of the power transistor switch Q1 in the current switching period. Timing control in this interval is similar to that in the previous switching period as described above in connection with the interval t0-t1 and, therefore, needs not be described in further detail herein.

Figure 6:
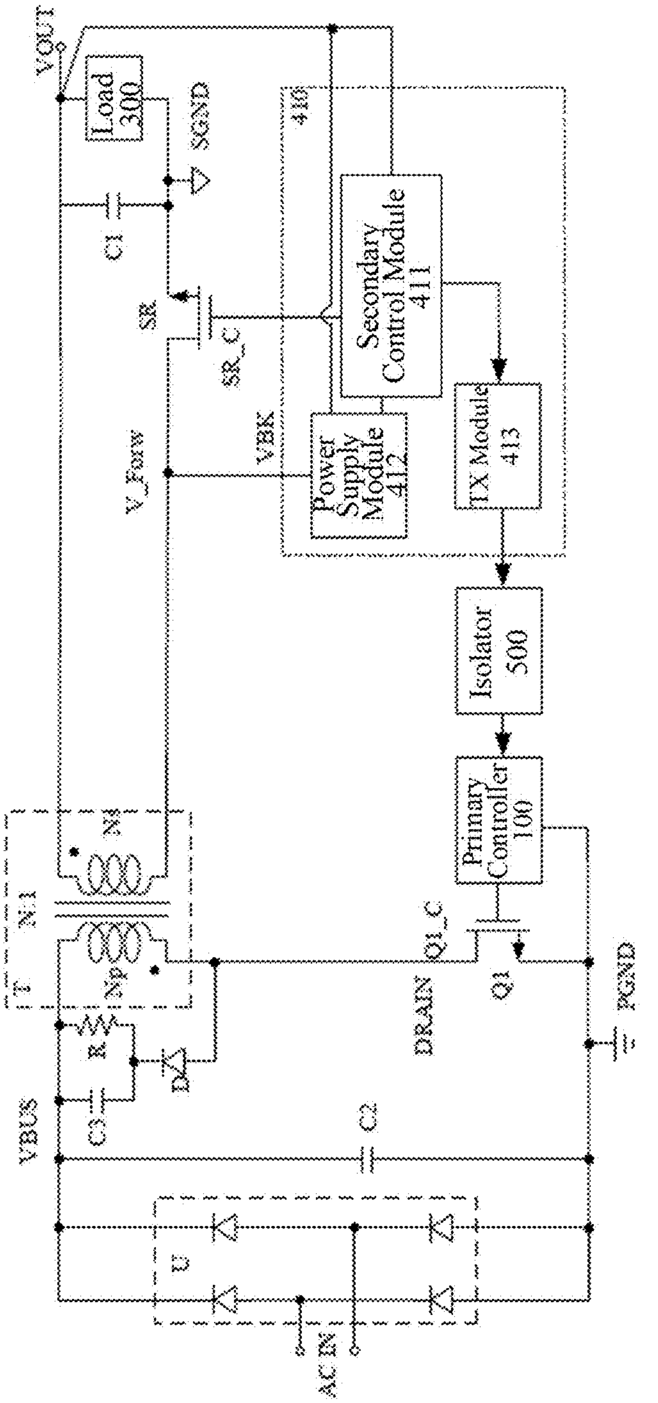
FIG. 6 shows an exemplary flyback converter employing a control device according to another embodiment of the present invention.

FIG. 6 schematically illustrates an exemplary flyback converter employing a control device 400 according to another preferred exemplary embodiment. As can be seen from FIG. 6, the power supply module 412 includes a charge pump (not shown). One input terminal of the charge pump is connected to the secondary control module 411, and another input terminal of the charge pump is connected to the output terminal of the flyback converter. An output terminal of the charge pump is connected to the connection node V_Forw of the secondary winding Ns and the synchronous rectifier SR. The charge pump is configured to double the output voltage of the flyback converter to enable the application of the tuning voltage or current to the connection node V_Forw within the predetermined period of time after the synchronous rectifier is turned off and before the power transistor switch is turned on. With this arrangement, since charge pumps can provide higher conversion efficiency (approximately 90-95% according to published literature) than other voltage conversion elements, the flyback converter control device 400 of the present invention, in which the power supply module 412 includes a charge pump, can provide even higher efficiency.

Figure 7:
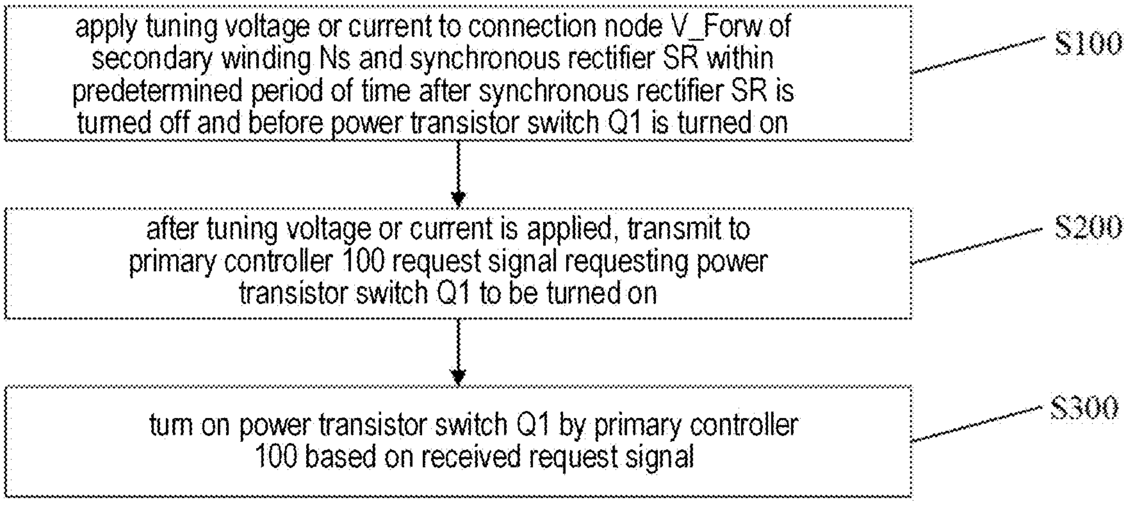
FIG. 7 is a schematic flowchart of a method for controlling a flyback converter according to an embodiment of the present invention.
Figure 8:
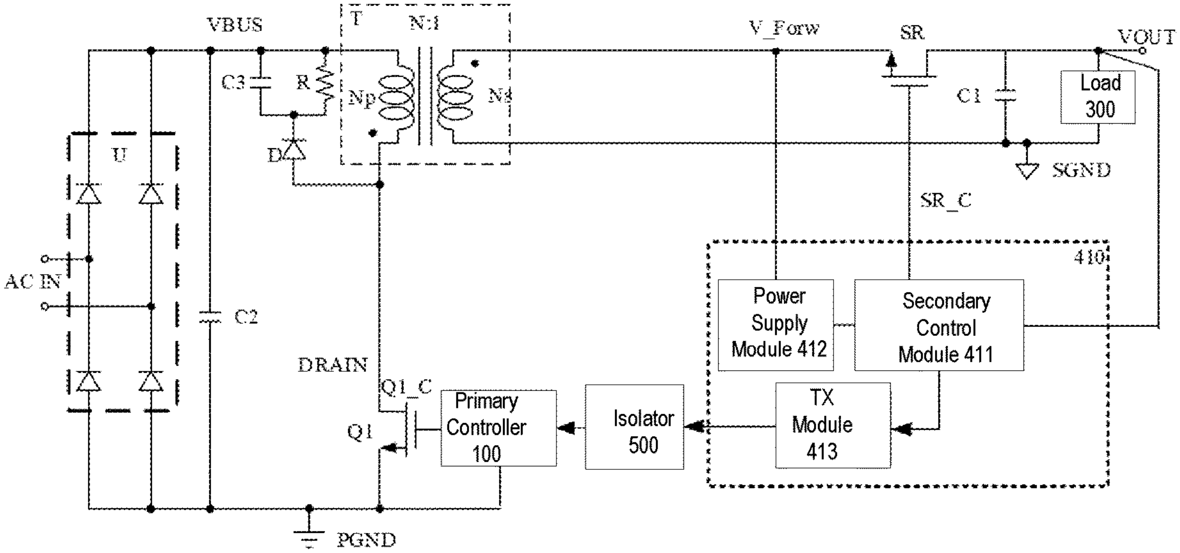
FIG. 8 shows another exemplary flyback converter employing a control device according to an embodiment of the present invention.

In another embodiment of the present invention, there is provided a method for controlling a flyback converter. Particular reference is now made to FIGS. 3, 4 and 6, or to FIGS. 8 and 7. FIG. 7 is a schematic flowchart of the method, and FIG. 8 is a block diagram of the flyback converter. The exemplary flyback converter shown in FIG. 8 incorporates a control device 400 according to an embodiment of the present invention. As can be seen from FIG. 3, 4, 6 or 8, the flyback converter includes a transformer T, a power transistor switch Q1 connected to a primary winding Np in the transformer T, a primary controller 100 connected to a control terminal of the power transistor switch Q1 and a synchronous rectifier SR connected to a secondary winding Ns in the transformer T. Particular reference is made to FIG. 7. As can be seen from FIG. 7, the method of this embodiment includes:

S100: applying a tuning voltage or current to a connection node V_Forw of the secondary winding Ns and the synchronous rectifier SR within a predetermined period of time after the synchronous rectifier SR is turned off and before the power transistor switch Q1 is turned on;

S200: after the tuning voltage or current is applied, transmitting to the primary controller 100 a request signal requesting the power transistor switch Q1 to be turned on; and S300: turning on the power transistor switch Q1 by the primary controller 100 based on the received request signal.

Optionally, the method further includes detecting a voltage at the connection node using a voltage detection method and determining a start time of application of the tuning voltage or current based on the voltage at the connection node.

Since the method of this embodiment is based on the same basic principles as the flyback converter control devices 400 of the foregoing embodiments, they are of the same inventive concept. Accordingly, the method of this embodiment has at least all the advantages of the control devices 400 of the foregoing embodiments. For the sake of brevity, no further description of these advantages is given here, and reference can be made to the above description in connection with the control devices 400 of the foregoing embodiments for more details of them.

In a further embodiment of the present invention, there is provided a flyback converter, which utilizes the above-described method to enable zero-voltage turn-on of a power transistor switch Q1 and/or includes the flyback converter control device 400 of any of the foregoing embodiments. Specifically, continued reference is made to FIG. 3. As can be seen from FIG. 3, according to this embodiment, the flyback converter includes a transformer T, a power transistor switch Q1 connected to a primary winding Np in the transformer T, a primary controller 100 connected to a control terminal of the power transistor switch Q1 and a synchronous rectifier SR connected to a secondary winding Ns in the transformer T. More specifically, the input terminal of the control device 400 is connected to an output terminal of the flyback converter, and the first output terminal of the control device 400 is connected to a control terminal of the synchronous rectifier SR. The second output terminal of the control device 400 is connected to a connection node V_Forw of the secondary winding Ns and the synchronous rectifier SR.

Since the flyback converter of this embodiment is based on the same basic principles as the method of the above embodiments and/or includes the flyback converter control device 400 of any of the foregoing embodiments, they are of the same inventive concept. Accordingly, the flyback converter of this embodiment has at least all the advantages of the control devices 400 of the foregoing embodiments. For the sake of brevity, no further description of these advantages is given here, and reference can be made to the above description in connection with the control devices 400 of the foregoing embodiments for more details of them.

Specifically, a first terminal (e.g., opposite terminal) of the primary winding Np is connected to a positive DC bus, and a first terminal (e.g., drain) of the power transistor switch Q1 is connected to a second terminal (e.g., same terminal) of the primary winding Np. A second terminal (e.g., source) of the power transistor switch Q1 is connected to a negative DC bus which may be grounded. It is noted that the present invention is not limited to any particular power transistor switch Q1 or synchronous rectifier SR in the flyback converter. In some embodiments, the power transistor switch Q1 may be implemented as an NMOS field effect transistor (FET). In some alternative embodiments, the power transistor switch Q1 may be implemented as a PMOSFET. Likewise, the synchronous rectifier SR may be implemented either as an NMOSFET, or as a PMOSFET. Further, the present invention is not limited to how the synchronous rectifier SR is connected in the flyback converter. The synchronous rectifier SR may be connected either to a first terminal (e.g., same terminal) of the secondary winding Ns, or to a second terminal (e.g., opposite terminal) of the secondary winding Ns.

More specifically, continued reference is made to FIG. 4, which schematically illustrates an example in which the synchronous rectifier SR is connected to the same terminal of the secondary winding Ns. As can be seen from FIG. 4, in this example, a source of the synchronous rectifier SR is grounded, and a drain of the synchronous rectifier SR is connected to the opposite terminal of the secondary winding Ns. The output terminal of the power supply module 412 in the control device 400 is connected to the connection node V_Forw where the opposite terminal of the secondary winding Ns is connected to the drain of the synchronous rectifier SR. Differing from the example of FIG. 4, in another example shown in FIG. 8, the synchronous rectifier SR is connected to the same terminal of the secondary winding Ns. More specifically, as can be seen from FIG. 8, the source of the synchronous rectifier SR is connected to the same terminal of the secondary winding Ns, and the output terminal of the power supply module 412 is connected to the connection node V_Forw where the same terminal of the secondary winding Ns is connected to the source of the synchronous rectifier SR. The drain of the synchronous rectifier SR is connected to the output terminal of the flyback converter. Thus, the present invention is not limited to any particular location where the control device 400 is connected to the secondary winding Ns of the flyback converter. The control device 400 may be connected either to the same terminal of the secondary winding Ns, or to the opposite terminal of the secondary winding Ns. However, the control device 400 must be connected to a wire connecting the secondary winding Ns and the synchronous rectifier SR. This enables the control device 400 of the present invention to have good adaptability.

Figure 3:
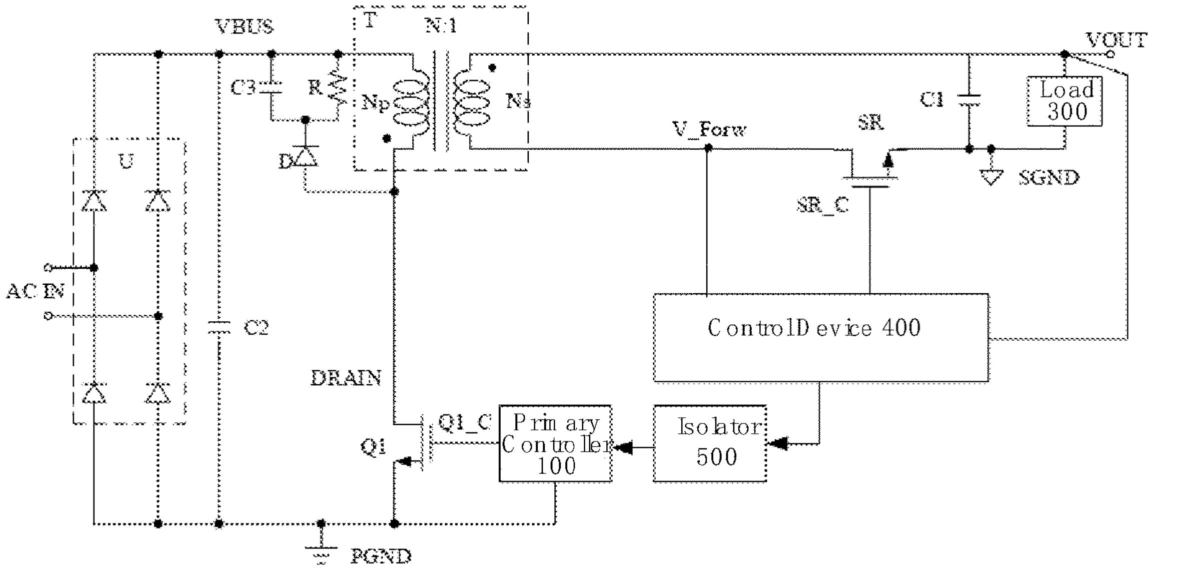
FIG. 3 is a schematic diagram showing the structure of a flyback converter employing a control device according to the present invention.

Continued reference is now made to FIG. 3, 4, 6 or 8. As can be seen from FIG. 3, 4, 6 or 8, in some optional exemplary embodiments, the flyback converter further includes a first capacitor C1. One end of the first capacitor C1 is connected to the output terminal of the flyback converter, and the other end of the first capacitor C1 is grounded. With this arrangement, a load 300 can more smoothly receive electric energy (in the form of a current and voltage) from the transformer T. In some specific embodiments, in which the synchronous rectifier SR is connected to the opposite terminal of the secondary winding Ns (as shown in FIGS. 3, 4 and 6), one end of the first capacitor C1 is connected to the same terminal of the secondary winding Ns. The other end of the first capacitor C1 is connected to the source of the synchronous rectifier SR, and the two are then both grounded. In some specific embodiments, in which the synchronous rectifier SR is connected to the same terminal of the secondary winding Ns (as shown in FIG. 8), one end of the first capacitor C1 is connected to the drain of the synchronous rectifier SR. The other end of the first capacitor C1 is connected to the opposite terminal of the secondary winding Ns, and the two are then both grounded.

The present invention is not limited to any load 300, with which the flyback converter is used. Examples of the load 300 may include, but are not limited to, computing devices and components thereof, such as microprocessors, electrical components, circuits, laptop computers, desktop computers and tablet computers, mobile phones, batteries, speakers, lighting devices, components of automobiles, ships, aircrafts and trains, motors, transformers and any other type of electrical equipment and/or circuit that receives a voltage or current from the flyback converter.

Continued reference is now made to FIG. 3, 4, 6 or 8. As can be seen from FIG. 3, 4, 6 or 8, in some optional exemplary embodiments, the flyback converter further includes a rectifier circuit U. An input terminal of the rectifier circuit U is connected to an AC power source. A first output terminal of the rectifier circuit U is connected to the first terminal of the primary winding Np in the transformer T by a wire serving as the aforementioned positive DC bus. In this way, electric energy can be more conveniently provided by the AC power source to the transformer T. The second terminal of the primary winding Np in the transformer T is connected to the first terminal of the power transistor switch Q1. A second output terminal of the rectifier circuit U is connected to the second terminal of the power switch Q1 by a wire serving as the aforementioned negative DC bus. Optionally, the flyback converter may further include a second capacitor C2 connected in parallel to the first and second output terminals of the rectifier circuit U. In this way, undesired AC components can be filtered out from the rectified power, resulting in smoother DC power. Examples of the AC power source may include, but are not limited to, power grids, generators, transformers T, solar panels, wind turbines, hydraulic or wind generators and any other types of devices capable of providing electric energy to the flyback converter.

Continued reference is now made to FIG. 3, 4, 6 or 8. As can be seen from FIG. 3, 4, 6 or 8, in some optional exemplary embodiments, the flyback converter further includes an energy absorber circuit connected in parallel to the opposite terminals of the primary winding Np in the transformer T. For example, the energy absorber circuit includes a resistor R, a third capacitor C3 and a diode D. Specifically, the resistor R and the third capacitor C3 are connected in parallel to each other. One end of the parallel-connected resistor R and third capacitor C3 is connected to a cathode of the diode D. The other end of the parallel-connected resistor R and third capacitor C3 is connected to the first terminal of the primary winding Np. An anode of the diode D is connected to the second terminal of the primary winding Np.

In a further embodiment of the present invention, there is provided a power supply system including the flyback converter of any of the foregoing embodiments. Since the power supply system of this embodiment incorporates the flyback converter of any of the foregoing embodiments, they are of the same inventive concept. Accordingly, the power supply system of this embodiment has all the advantages of the flyback converters of the foregoing embodiments. For the sake of brevity, no further description of these advantages is given here, and reference can be made to the above description in connection with the flyback converters of the foregoing embodiments for more details of them.

In addition, use of the terms "first" and "second" herein is intended for illustration only and is not to be construed as denoting or implying relative importance or as implicitly indicating the number of the referenced features. Therefore, describing a feature with the term "first" or "second" can explicitly or implicitly indicate the presence of at least one of the feature. As used herein, the term “plurality” means “at least two”, such as two or three, unless otherwise specified.

In summary, the control devices and methods of a flyback converter, flyback converters and power supply systems of the present invention have the following advantages over the prior art:

In the control devices of the present invention, through applying a tuning voltage, or injecting a tuning current, to the connection node of the secondary winding and the synchronous rectifier in a predetermined period of time after the synchronous rectifier is turned off and before the power transistor switch is turned on, a greater current flows through the secondary winding, lowering a voltage at the drain of the power transistor switch. Moreover, after the application of the tuning voltage or current is completed, a request signal requesting the power transistor switch to be turned on is transmitted to the primary controller through the third output terminal of the control device, and the primary controller then turns on the power transistor switch based on the received request signal. As such, in the control devices of the present invention, zero-voltage turn-on of the power transistor switch can be achieved, which can result in increased efficiency and a reduced temperature rise without complicating associated peripheral circuit. Thus, the size and cost of the flyback converter can be well controlled, it is made easy to implement.

Since the methods for controlling a flyback converter, flyback converters and power supply systems of the present invention are of the same inventive concept as the control devices of the present invention, they have at least all the advantages of the control devices of the present invention. For the sake of brevity, no further description of these advantages is given here, and reference can be made to the above description in connection with the control devices for more details of them.

Reference throughout this specification to “one embodiment”, “some embodiments”, “an example”, “a specific example”, “some examples” or the like means that a particular feature, structure, material, or characteristic described in connection with the embodiments or examples is included in at least one embodiment of the invention or example thereof. Thus, the appearances of those phrases in various places throughout this specification are not necessarily referring to the same embodiment of the invention or example thereof. Furthermore, the particular features, structures, materials, or characteristics may be combined in any suitable manner in any one or more embodiments. Further, should there be no contradiction, one of ordinary skill in the art can combine the various embodiments, examples and features thereof described herein in any combination.

In summary, control devices and methods of a flyback converter, flyback converters and power supply systems of various configurations constructed in accordance with the present invention have been described in detail above with reference to the foregoing embodiments. Of course, the above description is merely that of some preferred modes of carrying-out the invention and is in no way intended to limit the scope thereof. Possible configurations of the present invention include, but are not limited to, those described in the foregoing embodiments, and those skilled in the art can obtain more configurations in light of the above teachings. Accordingly, any and all variations and modification made by those of ordinary skill in the art to which the present invention pertains in light of the above teachings are intended to fall within the scope thereof as defined by the appended claims.

The invention claimed is:

1. A control device of a flyback converter, the flyback converter comprising a transformer, a power transistor switch connected to a primary winding in the transformer, a primary controller connected to a control terminal of the power transistor switch and a synchronous rectifier connected to a secondary winding in the transformer, wherein the control device comprises an input terminal configured to be connected to an output terminal of the flyback converter, a first output terminal configured to be connected to a control terminal of the synchronous rectifier, and a second output terminal configured to be connected to a connection node of the secondary winding and the synchronous rectifier, wherein the control device is configured to: apply a tuning voltage or current to the connection node within a predetermined period of time after the synchronous rectifier is turned off and before the power transistor switch is turned on; and after the tuning voltage or current is applied, transmit a request signal requesting the power transistor switch to be turned on to the primary controller through a third output terminal of the control device, wherein the primary controller is configured to turn on the power transistor switch based on a received request signal.

2. The control device according to claim 1, comprising a secondary control module, a power supply module and a transmit (TX) module, wherein the secondary control module comprises an input terminal configured to be connected to the input terminal of the control device, a first output terminal configured to be connected to the first output terminal of the control device, a second output terminal configured to be connected to an input terminal of the power supply module, and a third output terminal connected to an input terminal of the TX module, wherein the power supply module comprises an output terminal connected to the second output terminal of the control device, and wherein the TX module comprises an output terminal connected to the third output terminal of the control device, wherein the power supply module is configured to apply the tuning voltage or current to the connection node within the predetermined period of time after the synchronous rectifier is turned off and before the power transistor switch is turned on, wherein the secondary control module is configured to output a primary turn-on signal to the TX module after the power supply module completes application of the tuning voltage or current, and wherein the TX module is configured to transmit the request signal requesting the power transistor switch to be turned on to the primary controller based on the primary turn-on signal.

3. The control device according to claim 2, wherein the secondary control module is configured to detect a voltage at the connection node using a voltage detection method and to determine a start time of application of the tuning voltage or current by the power supply module based on the voltage at the connection node.

4. The control device according to claim 3, wherein the secondary control module is configured to take an instant when the voltage at the connection node reaches peak value as the start time of application of the tuning voltage or current by the power supply module.

5. The control device according to claim 2, wherein the power supply module comprises a charge pump, wherein the charge pump comprises a first input terminal connected to the secondary control module, a second input terminal connected to the output terminal of the flyback converter, and an output terminal connected to the second output terminal of the control device, wherein the charge pump is configured to apply the tuning voltage or current to the connection node based on an output voltage of the flyback converter within the predetermined period of time after the synchronous rectifier is turned off and before the power transistor switch is turned on.

6. The control device according to claim 5, wherein the control device is provided in a form of a control circuit chip.

7. A control method for a flyback converter, the flyback converter comprising a transformer, a power transistor switch connected to a primary winding in the transformer, a primary controller connected to a control terminal of the power transistor switch and a synchronous rectifier connected to a secondary winding in the transformer, wherein the control method comprises:

applying a tuning voltage or current to a connection node of the secondary winding and the synchronous rectifier within a predetermined period of time after the synchronous rectifier is turned off and before the power transistor switch is turned on;

after the tuning voltage or current is applied, transmitting a request signal requesting the power transistor switch to be turned on to the primary controller; and turning on the power transistor switch by the primary controller based on a received request signal.

8. The method according to claim 7, further comprising detecting a voltage at the connection node by using a voltage detection method and determining a start time of application of the tuning voltage or current based on the voltage at the connection node.

9. A flyback converter, comprising a transformer, a power transistor switch connected to a primary winding in the transformer, a primary controller connected to a control terminal of the power transistor switch and a synchronous rectifier connected to a secondary winding in the transformer, wherein the flyback converter utilizes a control method, wherein the control method comprises: applying a tuning voltage or current to a connection node of the secondary winding and the synchronous rectifier within a predetermined period of time after the synchronous rectifier is turned off and before the power transistor switch is turned on; after the tuning voltage or current is applied, transmitting a request signal requesting the power transistor switch to be turned on to the primary controller; and turning on the power transistor switch by the primary controller based on a received request signal, thereby achieving a zero-voltage turn-on of the power transistor switch; and/or the flyback converter comprises the control device of claim 1, wherein: the input terminal of the control device is connected to an output terminal of the flyback converter; the first output terminal of the control device is connected to a control terminal of the synchronous rectifier; and the second output terminal of the control device is connected to a connection node of the secondary winding and the synchronous rectifier.

10. The flyback converter according to claim 9, wherein: a source of the synchronous rectifier is grounded; a drain of the synchronous rectifier is connected to a first terminal of the secondary winding at the connection node; and an output terminal of the power supply module of the control device is connected to the connection node, or wherein: the source of the synchronous rectifier is connected to a second terminal of the secondary winding at the connection node; the output terminal of the power supply module is connected to the connection node; and the drain of the synchronous rectifier is connected to the output terminal of the flyback converter.

11. The flyback converter according to claim 9, further comprising a first capacitor, wherein a first terminal of the first capacitor is connected to the output terminal of the flyback converter, and a second terminal of the first capacitor is grounded.

12. The flyback converter according to claim 9, further comprising a rectifier circuit, wherein the rectifier circuit comprises an input terminal connected to an AC power source, a first output terminal connected to a first terminal of the primary winding in the transformer, and a second output terminal connected to a second terminal of the power transistor switch, and wherein a second terminal of the primary winding in the transformer is connected to a first terminal of the power transistor switch.

13. The flyback converter according to claim 9, further comprising an energy absorber circuit connected to opposite terminals of the primary winding in the transformer.

14. The flyback converter according to claim 9, wherein the control device comprises a secondary control module, a power supply module and a transmit (TX) module, wherein the secondary control module comprises an input terminal configured to be connected to the input terminal of the control device, a first output terminal configured to be connected to the first output terminal of the control device, a second output terminal configured to be connected to an input terminal of the power supply module, and a third output terminal connected to an input terminal of the TX module, wherein the power supply module comprises an output terminal connected to the second output terminal of the control device, and wherein the TX module comprises an output terminal connected to the third output terminal of the control device, wherein the power supply module is configured to apply the tuning voltage or current to the connection node within the predetermined period of time after the synchronous rectifier is turned off and before the power transistor switch is turned on, wherein the secondary control module is configured to output a primary turn-on signal to the TX module after the power supply module completes application of the tuning voltage or current, and wherein the TX module is configured to transmit the request signal requesting the power transistor switch to be turned on to the primary controller based on the primary turn-on signal.

15. The flyback converter according to claim 14, wherein the secondary control module is configured to detect a voltage at the connection node using a voltage detection method and to determine a start time of application of the tuning voltage or current by the power supply module based on the voltage at the connection node.

16. The flyback converter according to claim 15, wherein the secondary control module is configured to take an instant when the voltage at the connection node reaches peak value as the start time of application of the tuning voltage or current by the power supply module.

17. The flyback converter according to claim 14, wherein the power supply module comprises a charge pump, wherein the charge pump comprises a first input terminal connected to the secondary control module, a second input terminal connected to the output terminal of the flyback converter, and an output terminal connected to the second output terminal of the control device, wherein the charge pump is configured to apply the tuning voltage or current to the connection node based on an output voltage of the flyback converter within the predetermined period of time after the synchronous rectifier is turned off and before the power transistor switch is turned on.

18. The flyback converter according to claim 17, wherein the control device is provided in a form of a control circuit chip.

* * * * *